United States Patent
Bharti et al.

(10) Patent No.: US 11,880,387 B2
(45) Date of Patent: Jan. 23, 2024

(54) COGNITIVE ANALYSIS OF HIERARCHICAL DATABASE ELEMENTS FOR GENERATION OF MICROSERVICES

(71) Applicant: International Business Machines Corporation, Armonk, NY (US)

(72) Inventors: Harish Bharti, Pune (IN); Balakrishnan Sreenivasan, Jayanagar (IN); Joydeep Banerjee, Kolkata (IN); Sandeep Sukhija, Rajasthan (IN); Shweta Jain, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 17/303,720

(22) Filed: Jun. 6, 2021

(65) Prior Publication Data
US 2022/0391412 A1    Dec. 8, 2022

(51) Int. Cl.
*G06F 16/28*      (2019.01)
*G06F 16/21*      (2019.01)
(Continued)

(52) U.S. Cl.
CPC .......... *G06F 16/282* (2019.01); *G06F 16/217* (2019.01); *G06F 16/2358* (2019.01);
(Continued)

(58) Field of Classification Search
CPC .. G06F 16/282; G06F 16/217; G06F 16/2358; G06F 6/2282; G06F 11/3409;
(Continued)

(56) References Cited

U.S. PATENT DOCUMENTS

| 4,908,759 A | 3/1990 | Alexander, Jr. |
| 6,418,443 B1 | 7/2002 | Martin, Jr. |
| (Continued) | | |

FOREIGN PATENT DOCUMENTS

| CN | 112308521 A | 2/2021 |
| CN | 112540749 A | 3/2021 |
| (Continued) | | |

OTHER PUBLICATIONS

"IMS Database Modernization Options", Modern Systems, last printed Jun. 2, 2021, 3 pages, <https://modernsystems.com/automated-ims-database-conversion/>.

(Continued)

*Primary Examiner* — Pierre M Vital
*Assistant Examiner* — Cecile H Vo
(74) *Attorney, Agent, or Firm* — Michael A. Petrocelli

(57) ABSTRACT

A computer identifies, within a hierarchical database, data elements associated with a selected function associated with the database, comprising. The computer identifies at least one function associated with a hierarchical database containing data elements. The computer, in response to identifying the function, identifies within a list of indicia, at least one reference indicia corresponding to the at least one function. The computer identifies within a monolithic application relevant code elements associated with the reference indicia. The computer generates an activity log associated with execution of the relevant code elements. The computer identifies, within the activity log, a group of data elements associated with the execution of the relevant code elements. The computer generates a group data element clusters using a Machine Learning algorithm. The computer identifies at least one of the group of data element clusters as relevant to the at least one function.

20 Claims, 11 Drawing Sheets

(51) Int. Cl.
  *G06N 20/00* (2019.01)
  *G06F 16/23* (2019.01)
  *G06F 18/22* (2023.01)
  *G06F 18/2413* (2023.01)
  *G06F 18/23* (2023.01)

(52) U.S. Cl.
  CPC ........ *G06F 18/22* (2023.01); *G06F 18/24147* (2023.01); *G06N 20/00* (2019.01)

(58) Field of Classification Search
  CPC .... G06F 16/27; G06F 18/22; G06F 18/24147; G06F 16/25; G06F 18/232; G06F 18/2325; G06F 18/2337; G06K 9/6215; G06K 9/6276; G06N 20/00; G06V 10/70; G06V 10/766; G06V 30/191; G06V 10/764; G06V 30/19173
  See application file for complete search history.

(56) References Cited

U.S. PATENT DOCUMENTS

| | | | |
|---|---|---|---|
| 6,622,142 | B1 | 9/2003 | Murray |
| 11,546,417 | B2* | 1/2023 | Chen ................. G06N 20/00 |
| 2005/0240638 | A1 | 10/2005 | Fisher |
| 2014/0129984 | A1* | 5/2014 | Sreedharan ............ G06N 20/00 715/817 |
| 2020/0019388 | A1 | 1/2020 | Jaeger |
| 2020/0285451 | A1* | 9/2020 | Agarwal ................. G06F 8/60 |
| 2021/0029001 | A1 | 1/2021 | Sen |
| 2021/0035021 | A1* | 2/2021 | Sasson .................... G06N 3/08 |
| 2021/0294601 | A1* | 9/2021 | Vs ............................. G06F 8/75 |
| 2021/0349865 | A1* | 11/2021 | Shah ................. G06Q 30/0283 |

FOREIGN PATENT DOCUMENTS

| | | |
|---|---|---|
| CN | 112732231 A | 4/2021 |
| WO | 2022257610 A1 | 12/2022 |

OTHER PUBLICATIONS

Behara, Samir, Breaking the Monolithic Database in Your Microservices Architecture, DZone, Sep. 12, 2018, 6 pages, <https://dzone.com/articles/breaking-the-monolithic-database-in-your-microserv>.

Mell, et al., "The NIST Definition of Cloud Computing", National Institute of Standards and Technology, Special Publication 800-145, Sep. 2011, 7 pages.

Newman, Sam, "Decomposing the Database", Monolith to Microservices, Chapter 4, Nov. 2019, 98 pages, <https://www.oreilly.com/library/view/monolith-to-microservices/9781492047834/ch04.html>.

Norelus, Ernese, "Implementing Domain-Driven Design for Microservice Architecture", Apr. 28, 2019, 18 pages, <https://medium.com/design-and-tech-co/implementing-domain-driven-design-for-microservice-architecture-26eb0333d72e>.

Park, et al., "An Approach for Reconstructing Applications to Develop Container-Based Microservices", Mobile Information Systems, vol. 2020, Article ID 4295937, Jan. 29, 2020, 23 pages, <https://www.hindawi.com/journals/misy/2020/4295937/>.

Taylor, Twain, "Decomposing a monolithic database for microservices", Tech Target, Aug. 3, 2020, 5 pages, <https://searchapparchitecture.techtarget.com/tip/Decomposing-a-monolithic-database-for-microservices>.

Bharti, et al., "Cognitive Analysis of Hierarchical Database Elements for Generation Ofmicroservices", International Application No. PCT/CN2022/087675, International Filing Date Apr. 19, 2022, 49 pages.

International Searching Authority, "Notification of International Search Report and Written Opinion or Declaration", International Application No. PCT/CN2022/087675, dated Jul. 20, 2022, 9 pages.

Jin, et al., "Functionality-oriented Microservice Extraction Based on Execution Trace Cluster", 2018 IEEE International Conference on Web Services, Jul. 2-7, 2018, pp. 211-218, <https://ieeexplore.ieee.org/document/8456351>.

* cited by examiner

— 408

| Industry Context Functions | Entity (hierarchical data element) |
|---|---|
| Workorder Management | WorkOrder |
| Maintenance Scheduling | Asset |
| Outage Management | Asset |
| Asset Purchasing | Asset |

| Reference Indicia ID# | Operation/Process ID# |
|---|---|
| Tracer #1 | Operation #1 |
| Tracer #2 | Operation #2 |

↑ 902    FIG. 9    ↑ 904    ←900

| Transaction # | Quantity of Occurrences | Operation Type | Targeted Top Data Element |
|---|---|---|---|
| 1 | Quantity 1 | Type 2 | Element #1 |
| 2 | Quantity 2 | Type 3 | Element #2 |
| 3 | Quantity 3 | Type 1 | Element #1 |
| 4 | Quantity 4 | Type 4 | Element #3 |

| Cluster # (Microservice application group) | Targeted Top Data Element # | Transaction # | Operation Type |
|---|---|---|---|
| 1 | 1 | 1 | Type 1 |
|   | 2 | 2 | Type 2 |
|   | 3 | 4 | Type 1 |
| 2 | 4 | 7 | Type 3 |
| 3 | 5 | 8 | Type 2 |
|   | 6 | 9 | Type 3 |

↑ 710    ↑ 712    ↑ 1002    ↑ 1006

FIG. 11

COGNITIVE ANALYSIS OF HIERARCHICAL DATABASE ELEMENTS FOR GENERATION OF MICROSERVICES

BACKGROUND

The present invention relates generally to the field of computerized databases and, more specifically, to converting monolithic database applications into equivalent microservices.

Legacy computer systems can provide a variety of database-driven functions. These functions may vary from one industry to another, and a single legacy system can provide a customized solution to meet the needs of many users at one time. Unfortunately, many legacy systems were developed using a monolithic architecture philosophy in which single, complex systems provide many, or in some cases all, data-driven functions within a given system. It can be difficult to modify these systems once initial development is complete. For a variety reasons, it can be difficult to adjust the scope of monolithic applications, both in terms of user functionality and in terms of user capacity. Database systems with monolithic designs may not be able to provide ongoing service as system needs increase.

In contrast, database systems that incorporate groups of modules (sometimes known as microservices) can provide ongoing flexibility, accommodating not only application scope increases, but also increases in user base. Moreover, use of microservices can improve overall system reliability by, for example, decoupling independent services and allowing for focused application coding.

Unfortunately, converting monolithic systems into a microservice architecture can be difficult, especially for systems based on data arranged in multi-tiered, hierarchical data structures.

SUMMARY

According to one embodiment, a computer-implemented method for identifying within a hierarchical database, data elements associated with a selected function associated with the database, includes identifying by a computer, at least one function associated with a hierarchical database containing data elements. The computer, in response to identifying the function, identifying by the computer within a list of indicia available to the computer, at least one reference indicia corresponding to the at least one function. The computer identifies, within a monolithic application including code elements adapted to interact with the hierarchical database, relevant code elements associated with the reference indicia. The computer generates an activity log associated with execution of the relevant code elements. The computer identifies, within the activity log, a plurality of data elements associated with the execution of the relevant code elements. The computer generates a plurality data element clusters using a Machine Learning algorithm. The computer identifies at least one of the plurality of data element clusters as relevant to the at least one function. According to aspects of the invention, the relevant code elements are selected, at least in part, on meeting a predetermined sufficiency threshold. According to aspects of the invention, the list of indicia is based, at least in part, on code elements included in the monolithic application. According to aspects of the invention, the list of indicia is based, at least in part, on content within the activity log. According to aspects of the invention, the ML method is a K-Nearest Neighbor algorithm. According to aspects of the invention, the clusters are based, at least in part, on a measured Hamming distance among the plurality of data elements. According to aspects of the invention, a training dataset for the ML algorithm includes data pairs associating the relevant data elements with the least one reference indicia.

According to another embodiment, a system to identify within a hierarchical database, data elements associated with a selected function associated with the database, which includes a computer system comprising a computer readable storage medium having program instructions embodied therewith, the program instructions executable by a computer to cause the computer to identify at least one function associated with a hierarchical database containing data elements; responsive to identifying the function, identifying within a list of indicia available to the computer, at least one reference indicia corresponding to the at least one function; identify within a monolithic application including code elements adapted to interact with the hierarchical database, relevant code elements associated with the reference indicia; generate an activity log associated with execution of the relevant code elements; identify within the activity log, a plurality of data elements associated with the execution of the relevant code elements; generate a plurality data element clusters using a Machine Learning algorithm; identify at least one of the plurality of data element clusters as relevant to the at least one function.

According to another embodiment, a computer program product to identify within a hierarchical database, data elements associated with a selected function associated with the database, the computer program product comprising a computer readable storage medium having program instructions embodied therewith, the program instructions executable by a computer to cause the computer to: identify within a hierarchical database, data elements associated with a selected function associated with the database, which comprises: a computer system comprising a computer readable storage medium having program instructions embodied therewith, the program instructions executable by a computer to cause the computer to: identify, using the computer, at least one function associated with a hierarchical database containing data elements; responsive to identifying the function, identifying using the computer, within a list of indicia available to the computer, at least one reference indicia corresponding to the at least one function; identify, using the computer, within a monolithic application including code elements adapted to interact with the hierarchical database, relevant code elements associated with the reference indicia; generate, using the computer, an activity log associated with execution of the relevant code elements; identify, using the computer, within the activity log, a plurality of data elements associated with the execution of the relevant code elements; generate, using the computer, a plurality data element clusters using a Machine Learning algorithm; identify, using the computer, at least one of the plurality of data element clusters as relevant to the at least one function.

Aspects of the invention address the conversion of mainframe applications and systems embedded with domain or industry-based data access arrangements.

Aspects of the invention analyze hierarchical databases to determine relevant domain-driven business context target states appropriate for isolated, decoupled microservices.

Aspects of the invention identifies highly-used transactions, providing prioritized conversion targets that can maximize performance improvements when only some transactions are converted into microservices.

Aspects of the invention use code tracer elements (predefined and iteratively updated) or other reference indicia to match data elements to various system functions and industry capabilities.

Aspects of the invention use transaction logs to map top level entities (e.g., data elements or segments) associated with hierarchical database interaction and tracer elements (reference indicia) to identify lower-level segments (e.g., child segments).

Aspects of the invention use Machine Learning (ML) models (e.g., such as a K nearest neighbor algorithm, or similar clustering methods) to group database and code into clusters associated with identified business context functions. According to aspects of the invention, code tracer elements provide training data labels to train the ML model.

Aspects of the invention analyze a hierarchical database structure to identify entities included, entity relationships, and operation type from database definition files.

Aspects of the invention analyze application runtime transaction logs to identify data elements associated with transactions to interact with data. According to aspects of the invention, outcome of log analysis indicates which entities (e.g., data element segments) correspond to various business processes and data interaction functions and operations.

According to aspects of the invention, each data element entity has attributes (e.g., an "asset" entity might have attributes like commissioning date, cost, etc.; a "workorder" entity might have attributes like status of the work, date to complete; "customers" might have attributes like names, age, etc.).

According to aspects of the invention, each function (e.g., industry context) will has multiple data entities (e.g., the "workorder management" context can be associated with multiple entities data elements).

According to aspects of the invention, each context may need info from several entities, and a "top-level entity" simplifies assignment of entities and contexts.

According to aspects of the invention, a transaction is a process or operation executed by code elements that interact with data elements.

Aspects of the invention use a K nearest neighborhood model to identify the entities involved in a transaction using "tracers" identified for a process (e.g., based on training data) and these tracer associations are iteratively updated.

According to aspects of the invention, a function is a bounded context and represent a group of results generated by operations and procedures called by computer application code.

Groups of similar data elements can be identical or may be only partially matched (e.g., some groups may include more or fewer elements than other groups deemed similar).

The present disclosure recognizes and addresses the shortcomings and problems associated with converting monolithic applications that interact with hierarchical database content into domain-driven microservices that provide bounded-context-based functions.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 8 is a table showing selected aspects of industry contexts functions used in computer-implemented identification of functionally-related hierarchical database content and associated database application elements, according to an embodiment of the invention.

FIG. 9 is a table showing selected aspects of industry contexts functions used in computer-implemented identification of functionally-related hierarchical database content and associated database application elements, according to an embodiment of the invention.

FIG. 10 is a table showing selected aspects of industry contexts functions used in computer-implemented identification of functionally-related hierarchical database content and associated database application elements, according to an embodiment of the invention.

FIG. 11 is a table showing selected aspects of industry contexts functions used in computer-implemented identification of functionally-related hierarchical database content and associated database application elements, according to an embodiment of the invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
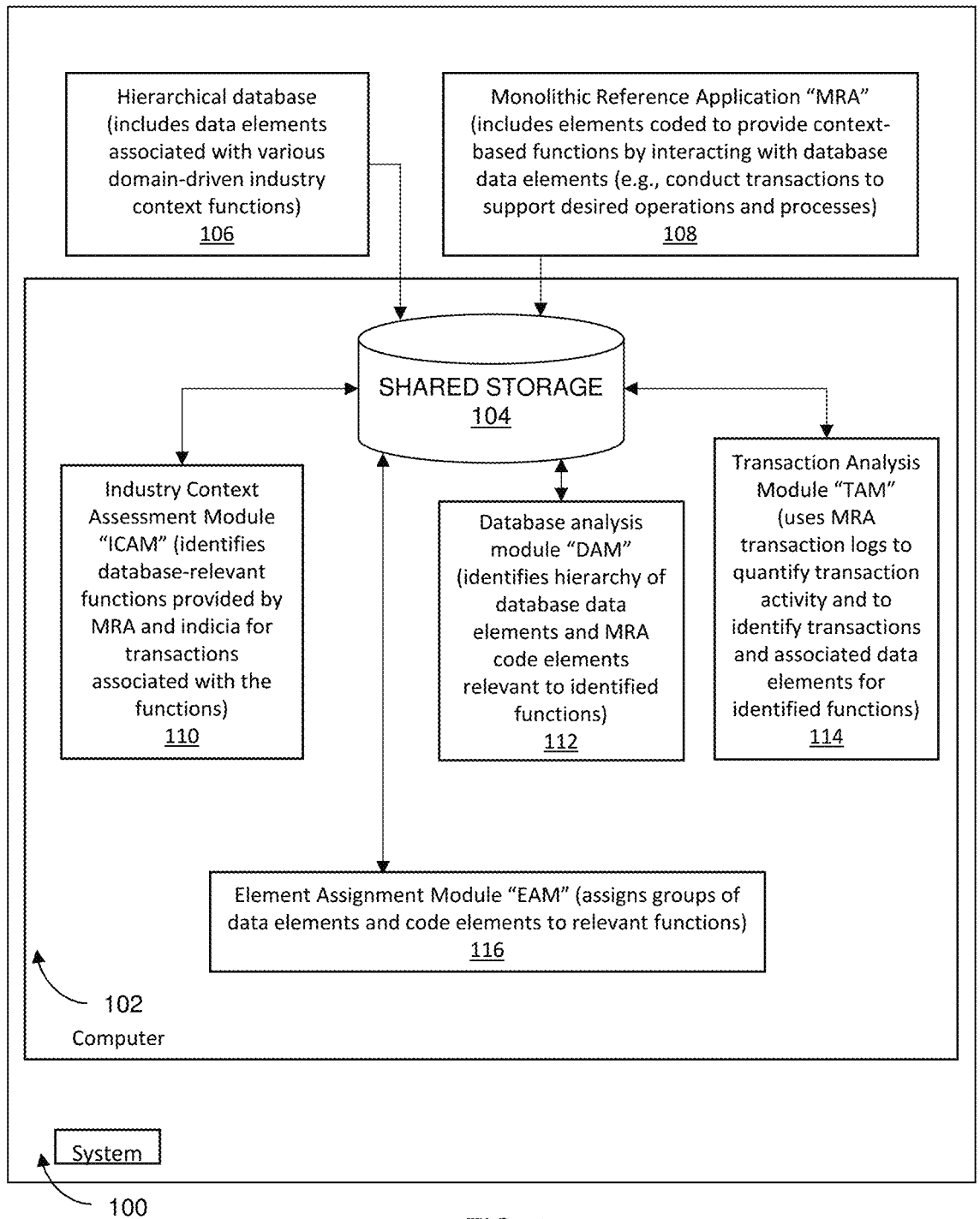
FIG. 1 is a schematic block diagram illustrating an overview of a system for computer-implemented identification of functionally-related hierarchical database content and associated database application elements, according to an embodiment of the invention.
Figure 2:
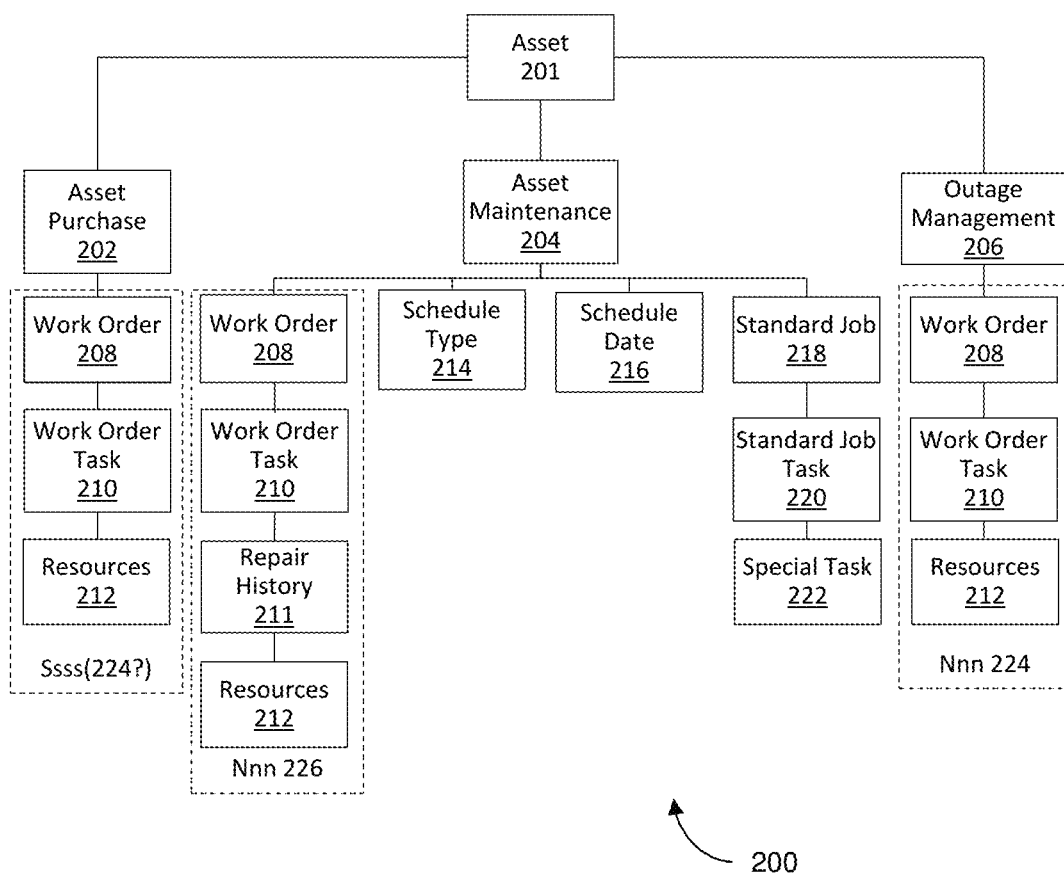
FIG. 2 is a schematic block diagram illustrating aspects of a hierarchical database used in computer-implemented identification of functionally-related hierarchical database content and associated database application elements, according to an embodiment of the invention.

Now with combined reference to the Figures generally and with particular reference to FIG. 1 and FIG. 2, an overview of a method for identifying functionally-related hierarchical database content and associated database application elements usable within a system 100, according to an embodiment of the present disclosure is shown. According to aspects of the invention, the method is carried out by a server computer 120 having optionally shared storage 104.

The server computer 102 is in operative communication with a hierarchical database 106 (such as a database in the format known as and an associated Monolithic Reference Application "MRA" 108. The database includes data elements (such as those 201, 202, 204, 206, 208, 210, 212, 214, 216 shown collectively as hierarchy 200 in FIG. 2) that are accessed by program code elements in the MRA 108 to perform operations that accomplish various capabilities and processes relevant to predetermined industry context functions (e.g., asset purchase 202, asset maintenance 204, outage management 206, and so forth). According to aspects of the invention, operation of the MRA 106 results in the server computer 102 making operation calls using an application program interface (API) to interact with elements of the database 108.

As will be more fully described below, the server computer 102 includes Industry Context Assessment Module "ICAM" 110 that identifies database-relevant contexts (e.g., data-related functions) provided by MRA and indicia for transactions associated with the functions).

As will be more fully described below, the server computer 102 includes Database Analysis Module "DAM" 112 that identifies the hierarchy of database data elements and MRA code elements relevant to identified functions.

As will be more fully described below, the server computer 102 includes Transaction Analysis Module "TAM" 114 that uses MRA transaction logs to quantify transaction activity and to identify transactions and associated data elements called for identified functions.

As will be more fully described below, the server computer 102 includes Element Assignment Module "EAM" 116 that identifies groups of transactions (e.g., operations that interact with identified data elements) associated with the functions (e.g., industry contexts) provided by the MRA 108. The server computer uses a Machine Learning (ML) model to classify these transactions based, at least in part on relevant data element similarity, and groups similar transactions into clusters appropriate for bundled assignment to a microservice application. It is noted that, according to aspects of the invention, a single microservice may address more than one function (e.g., several industry contexts). In an embodiment, the server computer 102 strategically groups transactions having similar data sets in support of speedy and efficient data access, application flexibility, and microservice architecture, in general.

Now with specific reference to FIG. 3, and to other figures generally, a method of identifying of functionally-related hierarchical database content and associated database application elements according to aspects of the invention will be described. The server computer 102 at block 302, via the Industry Context Assessment Module "ICAM" 110, identifies at least one function associated with a hierarchical database 106 containing a tiered collection 200 of data elements. The server computer 102, in response to identifying the one or more function, identifies within a list of indica available to the server computer, at least one reference indicia corresponding to the selected functions. In particular, according to aspects of the invention and with reference to FIG. 4, the ICAM 110 receives, at block 402 an indication of a relevant industry (e.g., energy, transportation, banking, and others selected by one skilled in this field). The server computer 102 receives a list of functions 404 (e.g., as shown in FIG. 8, business contexts, including Workorder Management, Maintenance Scheduling, Outage Management, Asset Purchasing, and others selected by one skilled in this field) associated with the identified industry, and one or more of those functions is selected as a possible candidate for inclusion with other functions that interact with similar data elements for assignment to a microservice application based. The server computer 102 receives a list of data elements 406 (e.g., preconfigured database entities or segments, such as Asset, Workorder, Workgroup, Customer, and others selected by one skilled in this field). The server computer 102, via ICAM 110 matches selected industry functions (e.g., contexts) with key data elements (e.g., a top level segment or entity) to generate an industry-context-to-entity map 408 (as seen, for example in FIG. 8). The server computer 102, via ICAM 110 at block 410 receives a list of function-indexed capabilities and processes and identifies in block 412, capabilities and processes associated with the selected functions. The server computer 102, receives via ICAM 110 at block 414, a list of tracer identification table 900 (shown schematically, for example, in FIG. 9) that includes tracers 902 (e.g., lines of code, key variables, or other reference indicia) associated with various process-related elements 904 in the MRA 108. The ICAM 110, at 416 identifies reference indicia for processes associated with selected context functions (as shown, for example in table 408. According to aspects of the invention, determination of reference indicia is based on process operations associated with actions and targeted data elements (e.g., a process "assign workgroup to workorder" will UPDATE a given WORKORDER with a WORKGROUP; a process "create workorder for maintenance schedule" will INSERT a new workorder into a corresponding MAINTENANCE SCHED-ULE, and so forth as selected by one skilled in this field).

Figure 3:
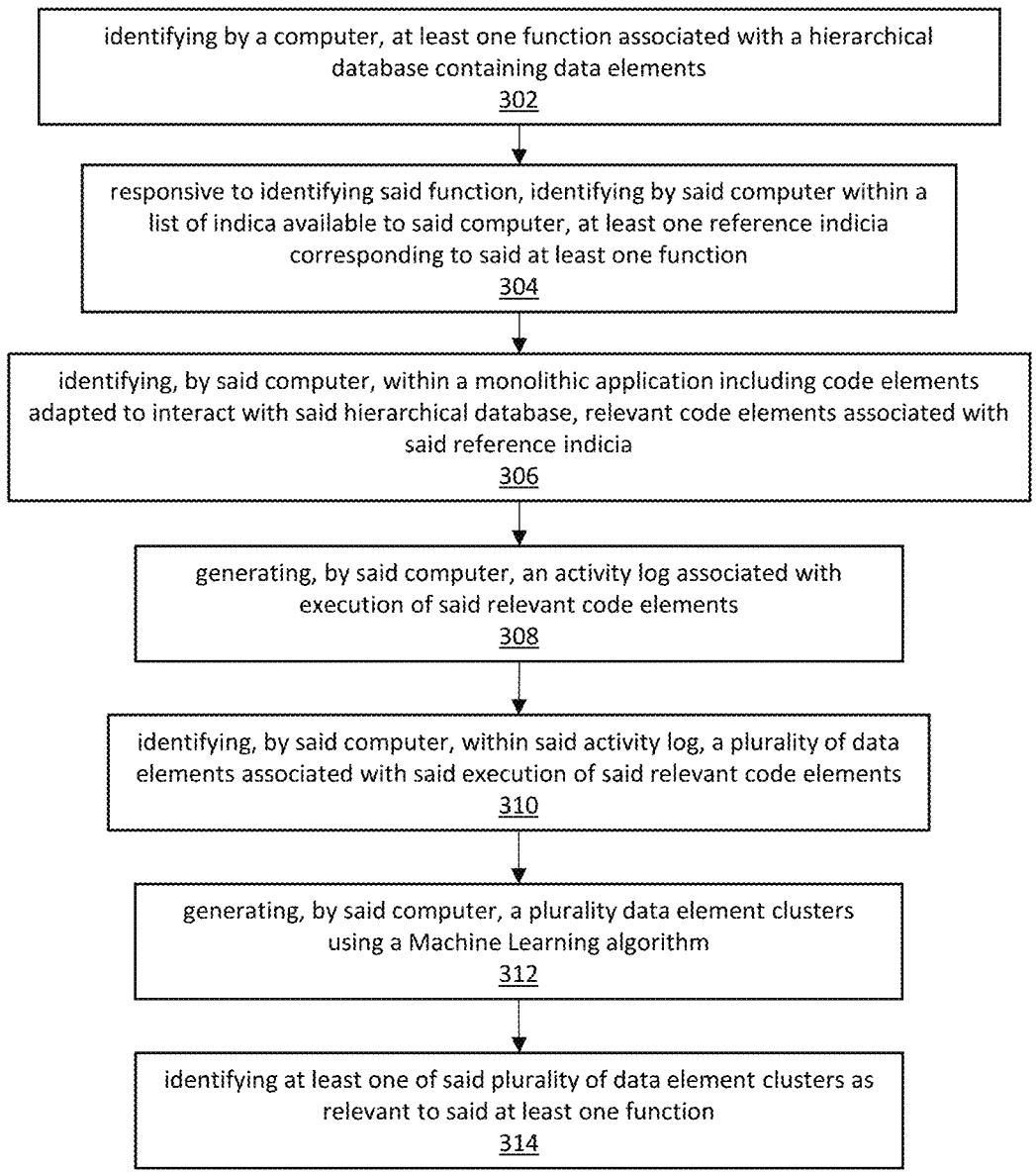
FIG. 3 is a flowchart illustrating a method, implemented using the system shown in FIG. 1, to identify functionally-related hierarchical database content and associated database application elements, according to an embodiment of the invention.
Figure 4:
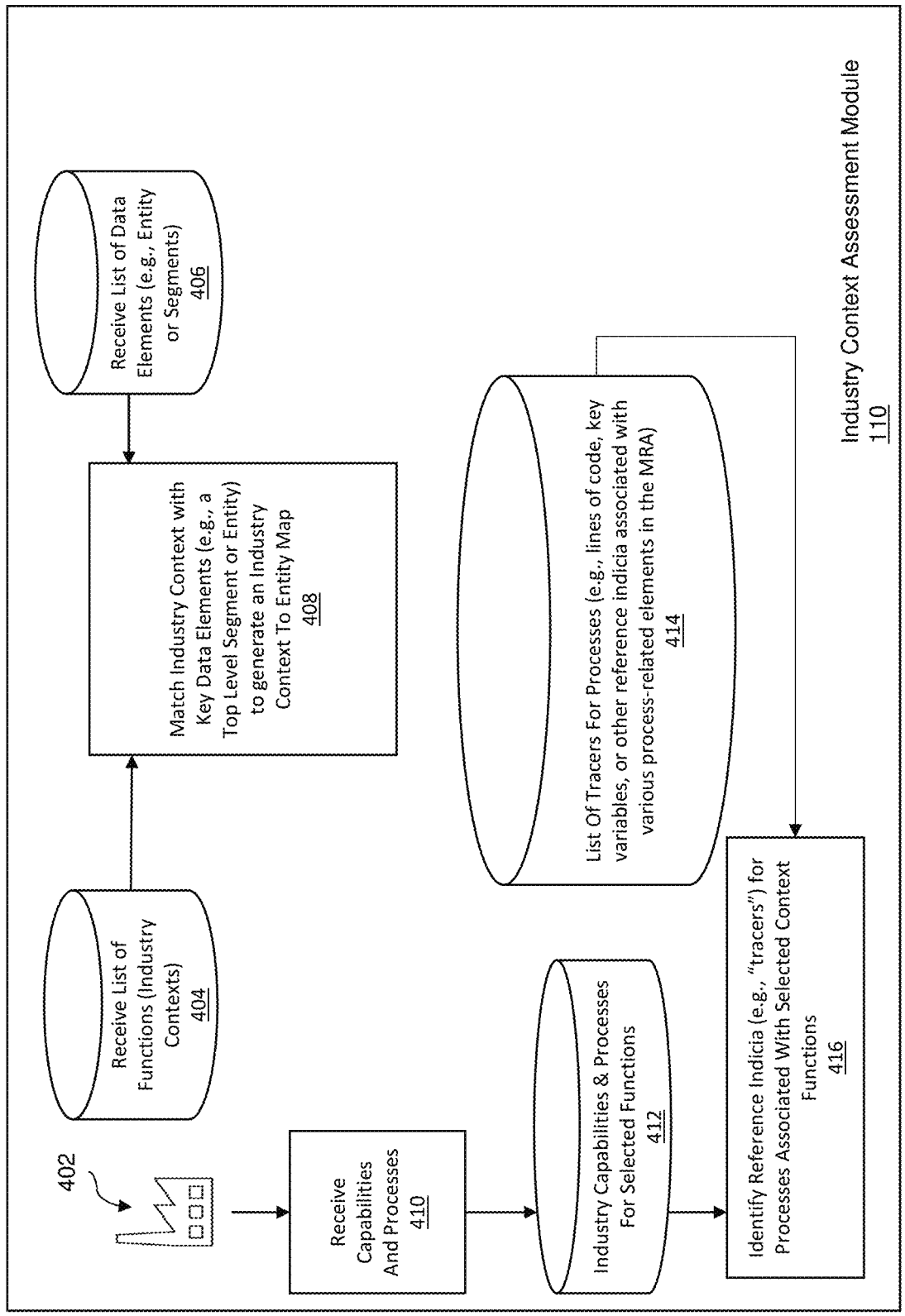
FIG. 4 is a schematic block diagram illustrating aspects of the system shown in FIG. 1 system.
Figure 5:
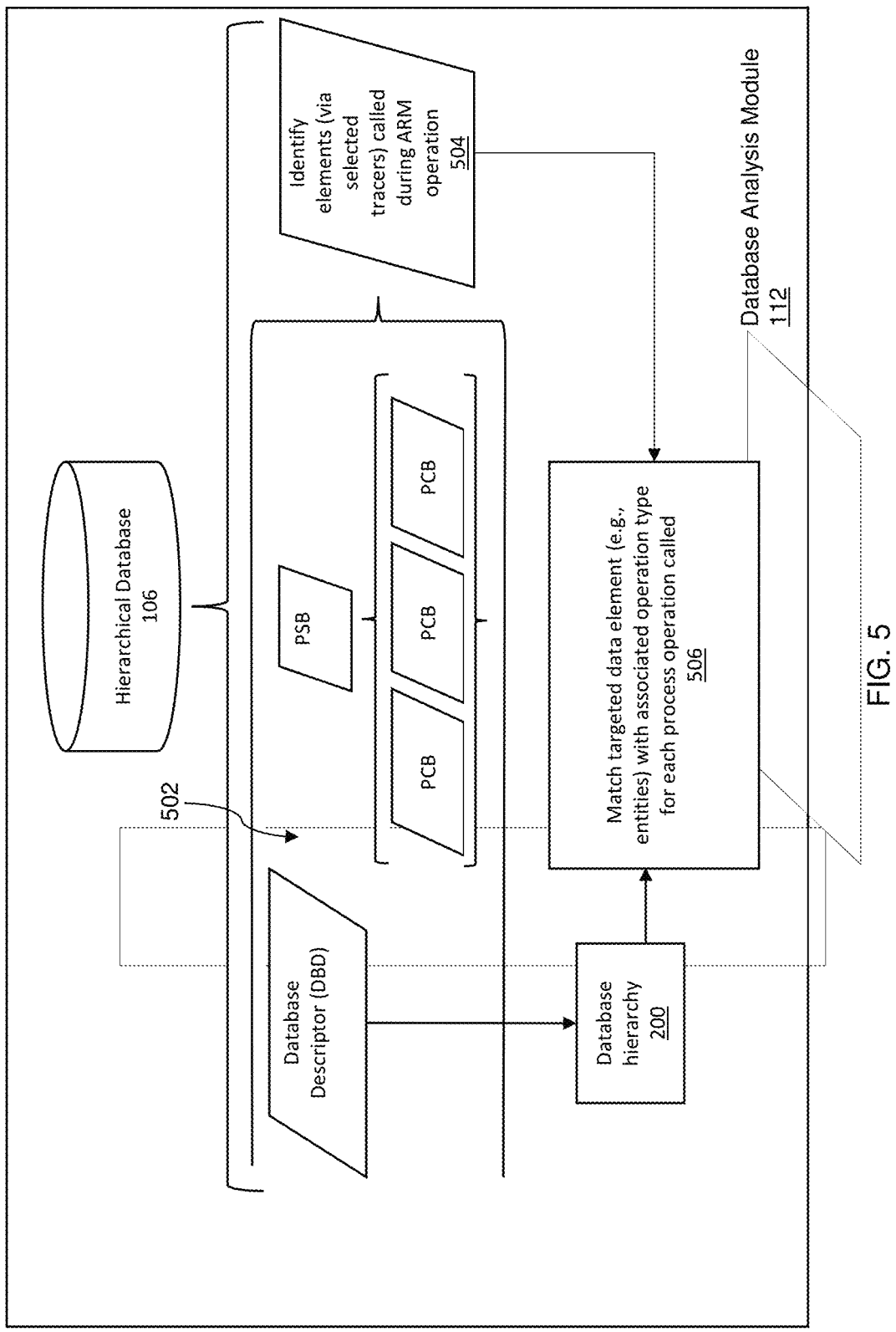
FIG. 5 is a schematic block diagram illustrating aspects of the system shown in FIG. 1 system.

With continued reference to FIG. 3, the server computer 102, via Database Analysis Monitor "DAM" 112 at block 306 identifies, within a monolithic application 108 including code elements adapted to interact with the hierarchical database 106, relevant code elements associated with the reference indicia (e.g., tracers) for processes associated with selected context functions (e.g., the tracers identified in block 416). In particular, according to aspects of the invention and with reference to FIG. 5, the ICAM 110 analyzes various database attribute files 502 associated with the hierarchical database 106 to determine various static attributes of the database 106. According to aspects of the invention, the DAM 112 interprets relevant Database Descriptors (DBDs), Program Specification Blocks (PSBs), and Program Communication Blocks (PCBs), to identify structural and control aspects of the database hierarchy 200. According to aspects of the invention, the DAM 112 identifies the code elements 504 (via identified tracers) associated with data interaction during runtime operation of the MRA 108. In an embodiment, the DAM 112 links targeted data elements 712 (e.g., entities, shown schematically in FIG. 11) with associated operation for each process operation called in function-relevant code of the MRA 108. According to aspects of the invention, the server computer 102 extracts database hierarchy information from the DBD descriptor and associates data elements called during runtime with operation type.

Figure 6:
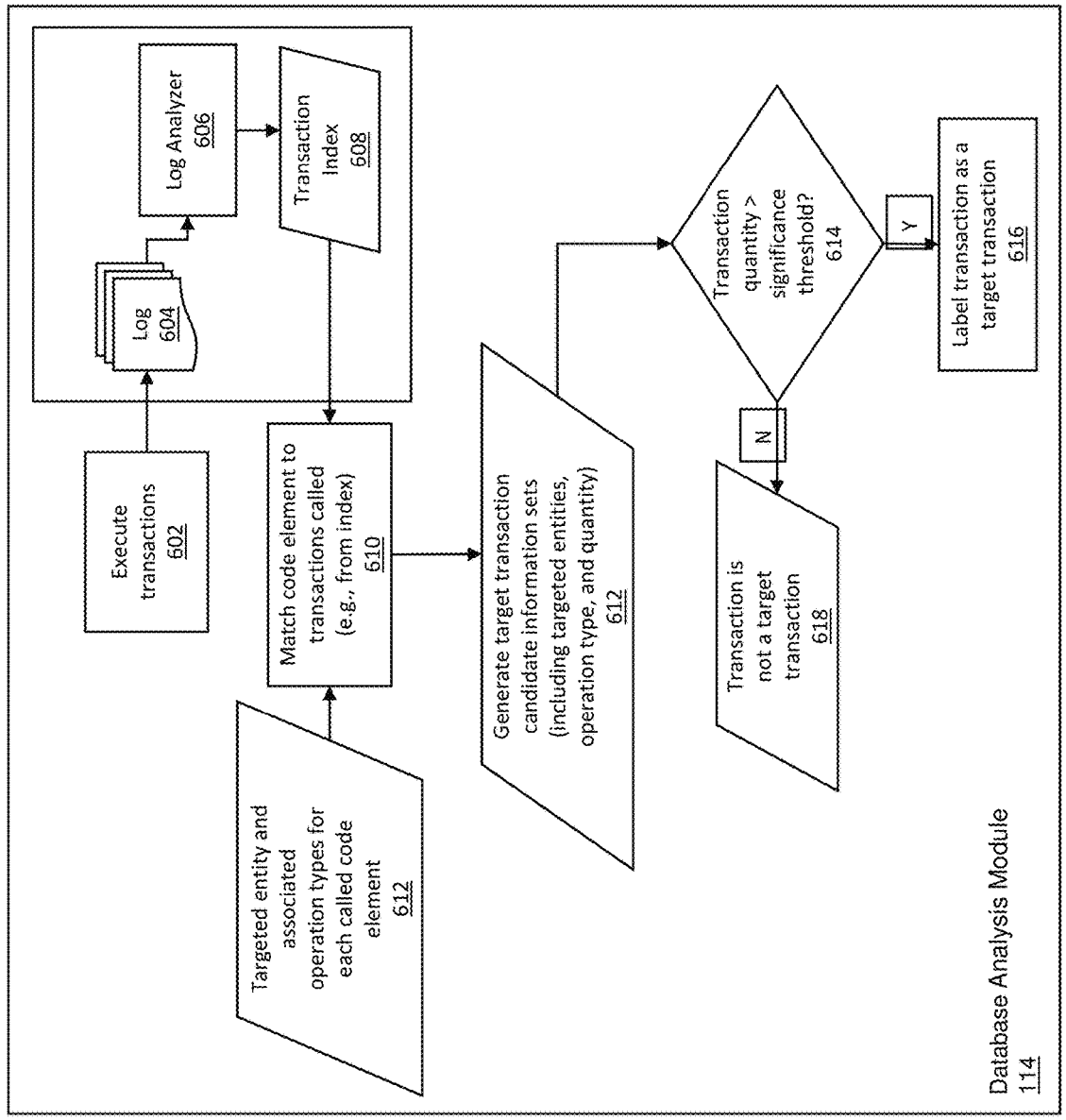
FIG. 6 is a schematic block diagram illustrating aspects of the system shown in FIG. 1 system.

With continued reference to FIG. 3, the server computer 102, via Transaction Analysis Module "TAM" 114 uses MRA transaction logs to quantify transaction activity and to identify transactions and associated data elements for identified functions. At block 308, the TAM 114 generates an activity log associated with execution of relevant code elements and, at block 310, identifies within the activity log, a plurality of data elements associated with said execution of the relevant code elements. In particular, according to aspects of the invention and with reference to FIG. 6, the TAM 114 at block 602 executes transactions associated with selected functions and generates an activity log 604 that includes performance data for selected executed transactions. According to aspects of the invention, the TAM 114 will, via any of several performance analysis applications 606 known to those skilled in the field, process the transaction log content to generate a transaction index 608 (representative aspects of which are shown schematically in FIG. 10). In an embodiment, the transaction index 608 includes for each transaction 1002, a quantity of occurrences 1004, an associated operation type 1006, and relevant data element segments 1008 (e.g., relevant entity). The TAM 114 will, at block 610 combine for each called transaction in the index 608, previously identified targeted data elements and associated operation type, and generate, at block 612, target transaction candidate information sets that include targeted data elements, operation type, and operation call quantity. According to aspects of the invention, transactions 1002 with an occurrence quantity 1004 exceeding a sufficiency threshold are considered target transitions to be considered further and analyzed for inclusion in microservice-ready transaction cluster groups. According to aspects of the invention, the sufficiency threshold is 10,000 calls per report cycle; it is noted, that this threshold value can be adjusted, and more or fewer transaction occurrences may be selected by one skilled in this field as the sufficiency threshold. The TAM 114 considers the transaction quantities provided in the target transaction candidate information sets and, at block 614, and determines whether each transaction is a target transaction 616 (e.g., has a quantity equaling or exceeding the sufficiency threshold) or not a target transaction 618. By limiting analysis to transactions having this level of activity (e.g., as indicated by the activity log), aspects of the present invention improve conversion efficiency, promoting downstream grouping of transactions that have the highest system impact when optimized.

Figure 7:
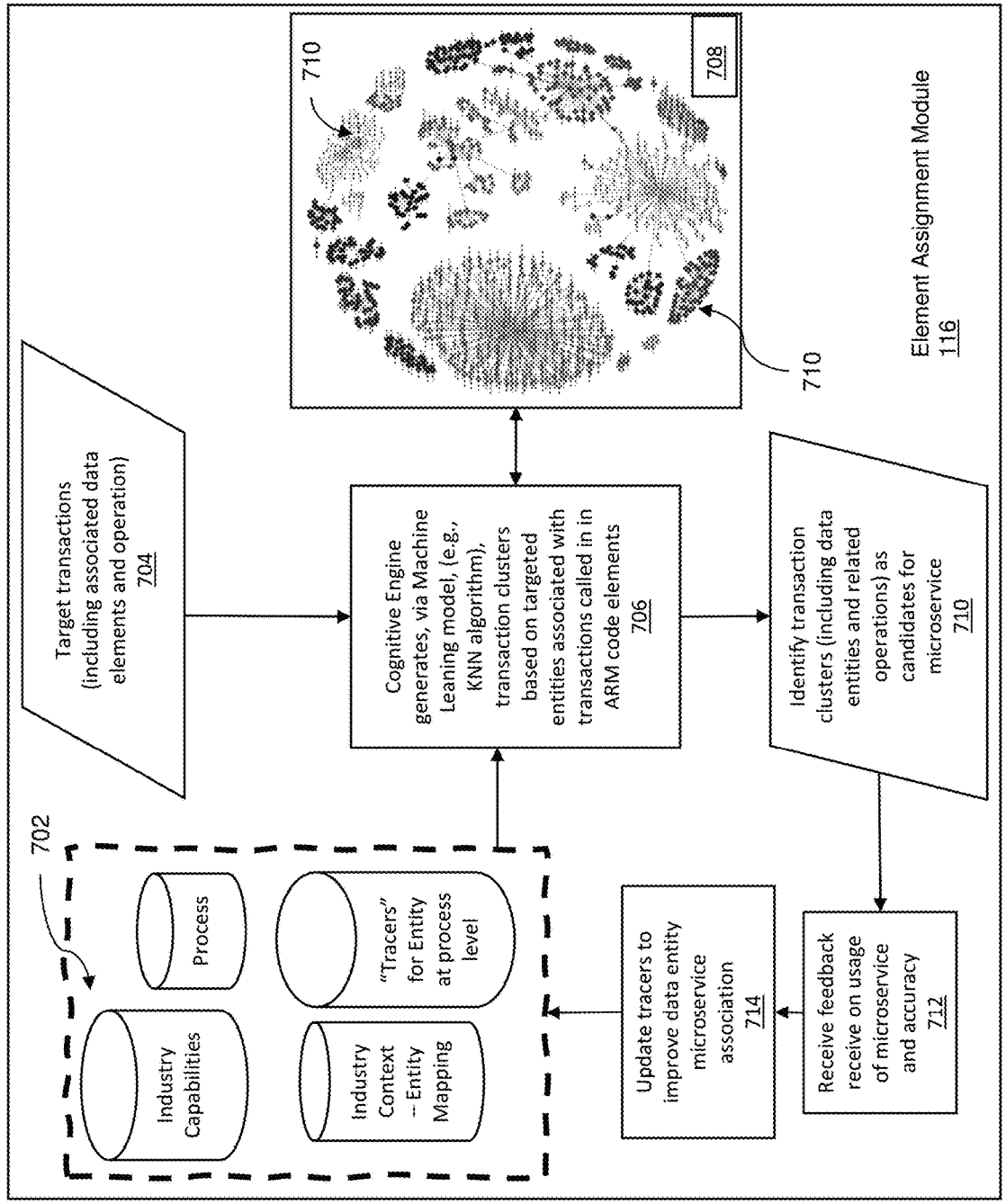
FIG. 7 is a schematic block diagram illustrating aspects of the system shown in FIG. 1 system.

With continued reference to FIG. 3, the server computer 102, via Element Assignment Module "EAM" 116 assigns groups of data elements and code elements to relevant functions. The EAM 116, at block 312 generates data element clusters using a Machine Learning algorithm and, at block 314, identifying at least one of said plurality of data element clusters as relevant to said at least one function. In particular, according to aspects of the invention and with reference to FIG. 7, the EAM 116 at block 702 gathers various artefacts (e.g., information about Industry Capabilities and processes, tracers for selected functions, and mapping of industry function contexts to associated data elements used to carry out those functions) and forwards this information to a cognitive engine (e.g., a Machine Learning model trained to classify data elements with associated transactions) for further consideration at block 706.

The EAM 116 also forwards, at block 704, target transaction information (e.g., associated data elements and operation for each target transaction) to the cognitive engine for further consideration. The EAM 116, via an ML model, (e.g., KNN algorithm), a map of transaction clusters (e.g., shown schematically at 708), based on targeted entities associated with transactions called in ARM code elements. In an embodiment, the ML model classifies a "K" number of nearest data element groups 224, 226 (as shown schematically in FIG. 2) as similar neighbors. According to aspects of the invention, the ML model uses a compared Hamming distance or other feature similarity comparison algorithm selected by one skilled in this field to generate these clusters 710. The ML model recognizes clusters of similar data element groups 224,226 and identifies entities associated with the relevant industry feature context. According to aspects of the invention, the server computer 102, via EAM at block 710 identifies transaction clusters 710 (including data entities and related operations) as candidates for microservice applications. According to aspects of the invention, each cluster 710 may include many transactions related to a variety of function contexts, with each transaction in a given cluster being assigned to the relevant cluster based, at least in part, on similarity of data element groups 224,226 associated with runtime execution of the function during operation. This improves data access efficiency and improves microservice data autonomy, providing increases in reliability, scalability, and data access speed. According to aspects of the invention, the EAM receives at block 712 receive feedback related to microservice assignment accuracy and uses this information in block 714 to update function tracers to improve microservice association. According to aspects of the invention, the server computer makes these updates through reinforcement learning algorithms, unsupervised adjustment methods, via supervised methods (e.g., re-training tracer training data via user feedback). It is noted that other tracer update methods may be selected by one skilled in this field. According to aspects of the invention, the tracers are iteratively updated, increasing the ML model accuracy over time.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
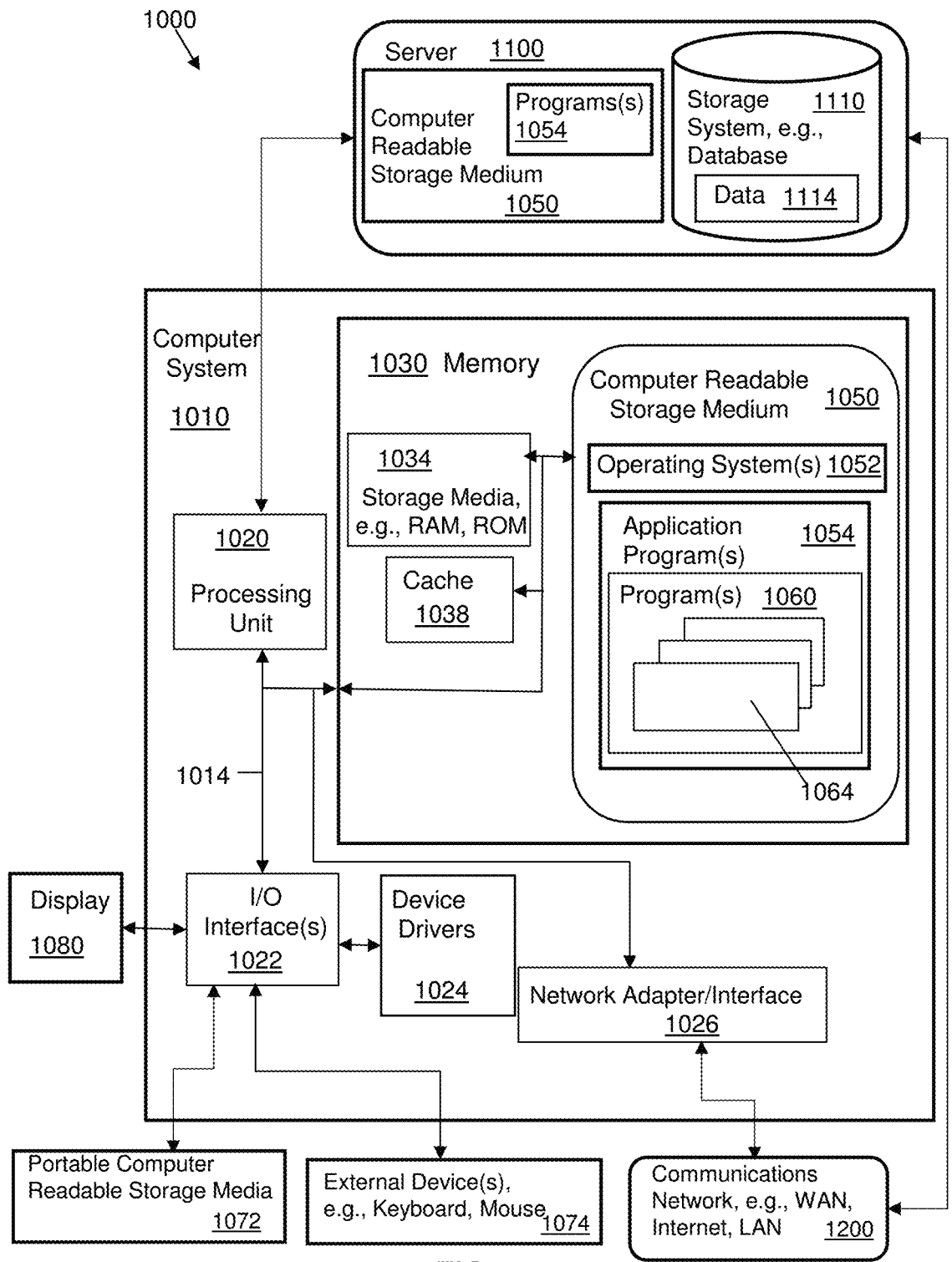
FIG. 12 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 12, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
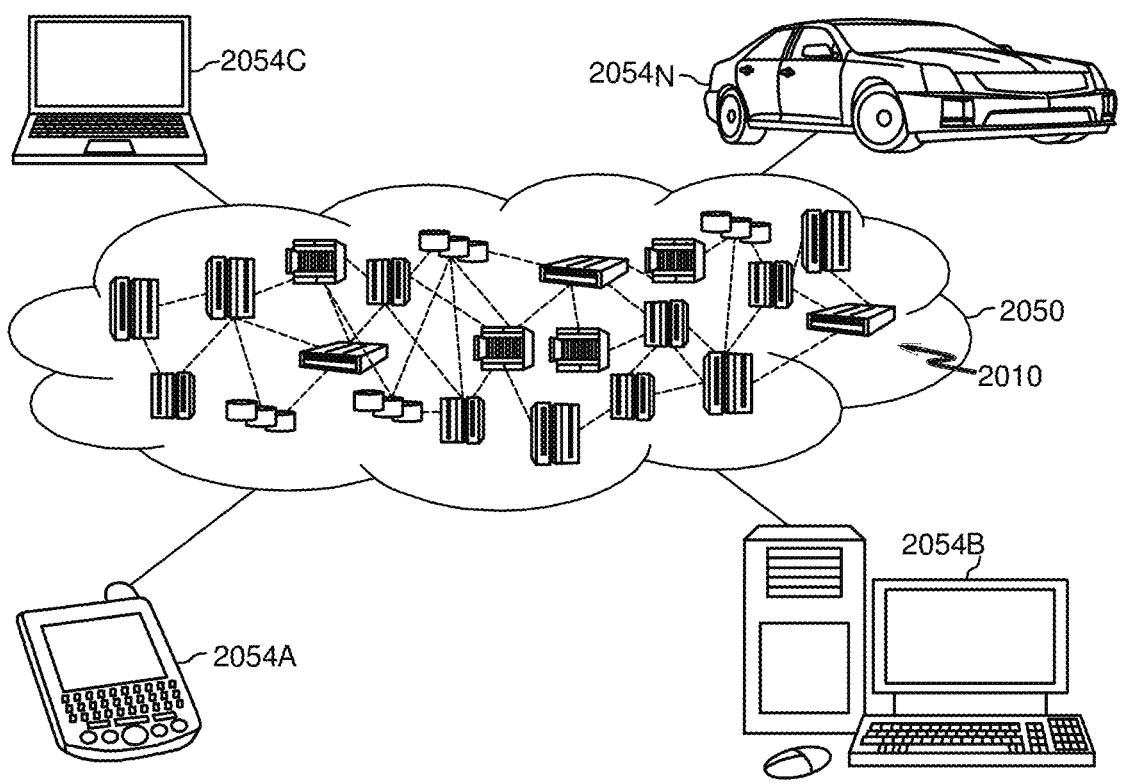
FIG. 13 depicts a cloud computing environment according to an embodiment of the present invention.

Referring now to FIG. 13, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 13 are intended to be illustrative only and that computing nodes 2010 and cloud computing environment 2050 can communicate with any type of computerized device over any type of network and/or network addressable connection (e.g., using a web browser).

Figure 14:
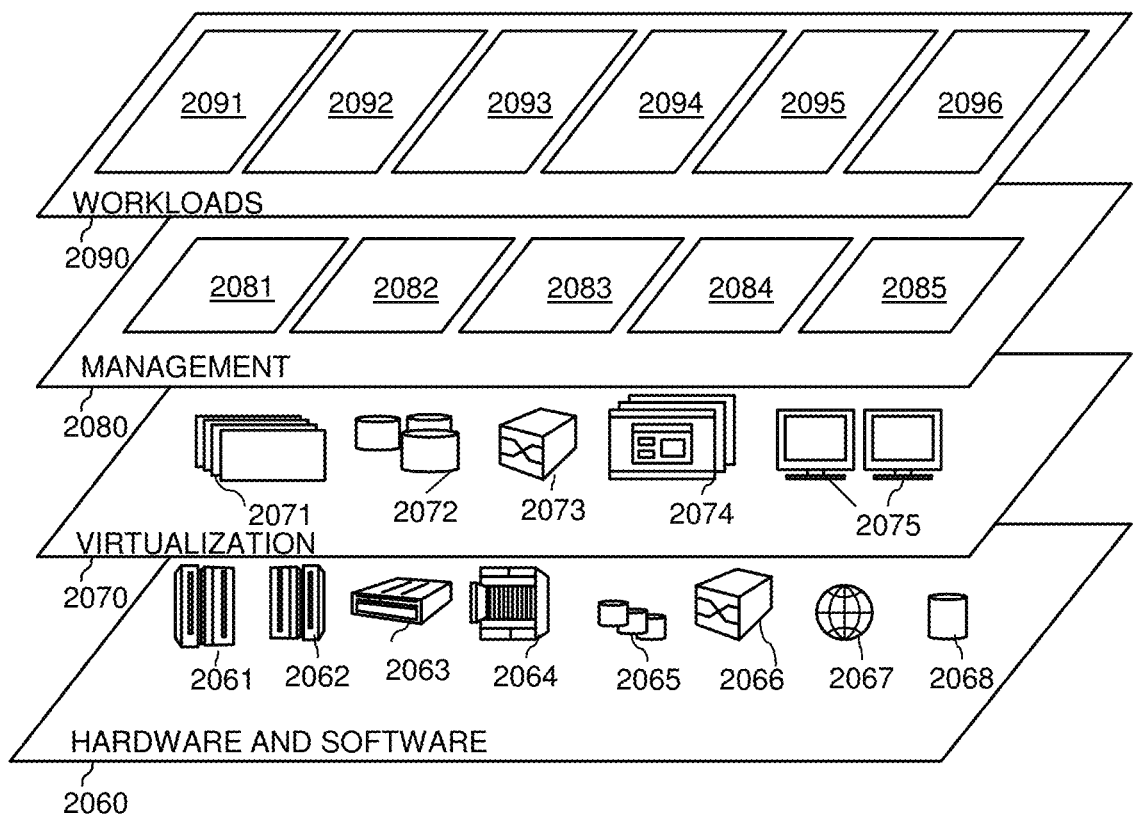
FIG. 14 depicts abstraction model layers according to an embodiment of the present invention.

Referring now to FIG. 14, a set of functional abstraction layers provided by cloud computing environment 2050 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and identifying of functionally-related hierarchical database content and associated database application elements 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to identify within a hierarchical database, data elements associated with a selected function associated with the database, comprising:
   identifying by a computer, at least one function of a plurality of functions associated with a hierarchical database containing data elements;
   responsive to identifying said function, identifying by said computer within a list of indica available to said computer, at least one reference indicia corresponding to said at least one function;
   identifying, by said computer, within a monolithic application including code elements adapted to interact with said hierarchical database, relevant code elements associated with said reference indicia;
   generating, by said computer, an activity log associated with execution of said relevant code elements;
   identifying, by said computer, within said activity log, a plurality of data elements associated with said execution of said relevant code elements;
   identifying, by said computer, transaction clusters as candidates for microservice applications, and one or more of the transaction clusters includes transactions related to the plurality of functions;
   generating a model, by said computer, using a Machine Learning algorithm, the model including a plurality of data element clusters, the data element clusters including similar data element groups, and the model identifying entities associated with relevant functions of the plurality of functions;
   identifying using the model, by said computer, at least one of said plurality of data element clusters as relevant to said at least one of the relevant functions of the plurality of functions; and
   assigning each transaction in at least one of said relevant data element clusters to the at least one relevant function, at least in part, based on similarity of data element groups associated with the execution of the at least one relevant function during an operation for each of the transactions.

2. The method of claim 1 wherein said relevant code elements are selected, at least in part, on meeting a predetermined sufficiency threshold.

3. The method of claim 1 wherein the list of indicia is based, at least in part, on code elements included in said monolithic application.

4. The method of claim 1 wherein the list of indica is based, at least in part, on content within the activity log.

5. The method of claim 1 wherein said ML method is a K-Nearest Neighbor algorithm.

6. The method of claim 1 wherein said clusters are based, at least in part, on a measured Hamming distance among said plurality of data elements.

7. The method of claim 1 wherein a training dataset for said ML algorithm includes data pairs associating said relevant data elements with said least one reference indicia.

8. A system to identify within a hierarchical database, data elements associated with a selected function associated with the database, which comprises:
   a computer system comprising a computer readable storage medium having program instructions embodied therewith, the program instructions executable by a computer to cause the computer to:
   identify at least one function of a plurality of functions associated with a hierarchical database containing data elements;
   responsive to identifying said function, identifying within a list of indica available to said computer, at least one reference indicia corresponding to said at least one function;
   identify within a monolithic application including code elements adapted to interact with said hierarchical database, relevant code elements associated with said reference indicia;
   generate an activity log associated with execution of said relevant code elements;
   identify within said activity log, a plurality of data elements associated with said execution of said relevant code elements;
   identifying, by said computer, transaction clusters as candidates for microservice applications, and one or more of the transaction clusters includes transactions related to the plurality of functions;
   generate a model using a Machine Learning algorithm, the model including a plurality of data element clusters, the data element clusters including similar data element groups, and the model identifying entities associated with relevant functions of the plurality of functions;
   identify using the model, at least one of said plurality of data element clusters as relevant to said at least one of the relevant functions of the plurality of functions; and
   assign each transaction in at least one of said relevant data element clusters to the at least one relevant function, at least in part, based on similarity of data element groups associated with the execution of the at least one relevant function during an operation for each of the transactions.

9. The system of claim 8 wherein said relevant code elements are selected, at least in part, on meeting a predetermined sufficiency threshold.

10. The system of claim 8 wherein the list of indicia is based, at least in part, on code elements included in said monolithic application.

11. The system of claim 8 wherein the list of indicia is based, at least in part, on content within the activity log.

12. The system of claim 8 wherein said ML method is a K-Nearest Neighbor algorithm.

13. The system of claim 8 wherein said clusters are based, at least in part, on a measured Hamming distance among said plurality of data elements.

14. The system of claim 8 wherein a training dataset for said ML algorithm includes data pairs associating said relevant data elements with said least one reference indicia.

15. A computer program product to identify within a hierarchical database, data elements associated with a selected function associated with the database, the computer program product comprising a computer readable storage medium having program instructions embodied therewith, the program instructions executable by a computer to cause the computer to:
   identify within a hierarchical database, data elements associated with a selected function associated with the database, which comprises:
   a computer system comprising a computer readable storage medium having program instructions embodied therewith, the program instructions executable by a computer to cause the computer to:
   identify, using the computer, at least one function of a plurality of functions associated with a hierarchical database containing data elements;
   responsive to identifying said function, identifying using the computer, within a list of indica available to said computer, at least one reference indicia corresponding to said at least one function;
   identify, using the computer, within a monolithic application including code elements adapted to interact with said hierarchical database, relevant code elements associated with said reference indicia;
   generate, using the computer, an activity log associated with execution of said relevant code elements;
   identify, using the computer, within said activity log, a plurality of data elements associated with said execution of said relevant code elements;
   identifying, by said computer, transaction clusters as candidates for microservice applications, and one or more of the transaction clusters includes transactions related to the plurality of functions;
   generate a model, using the computer, using a Machine Learning algorithm, the model including a plurality of data element clusters, the data element clusters including similar data element groups, and the model identifying entities associated with relevant functions of the plurality of functions;
   identify using the model, using the computer, at least one of said plurality of data element clusters as relevant to said at least one of the relevant functions of the plurality of functions and
   assign each transaction in at least one of said relevant data element clusters to the at least one relevant function, at least in part, based on similarity of data element groups associated with the execution of the at least one relevant function during an operation for each of the transactions.

16. The computer program product of claim 15 wherein said relevant code elements are selected, at least in part, on meeting a predetermined sufficiency threshold.

17. The computer program product of claim 15 wherein the list of indicia is based, at least in part, on code elements included in said monolithic application.

18. The computer program product of claim 15 wherein the list of indica is based, at least in part, on content within the activity log.

19. The computer program product of claim 15 wherein said ML method is a K-Nearest Neighbor algorithm.

20. The computer program product of claim 15 wherein a training dataset for said ML algorithm includes data pairs associating said relevant data elements with said least one reference indicia.

\* \* \* \* \*